United States Patent
Azzouz et al.

(10) Patent No.: US 10,301,863 B2
(45) Date of Patent: May 28, 2019

(54) MOUNTING AND ALIGNING A VEHICLE SIDE DOOR MOTOR WITHIN THE CURRENT BILL OF PROCESS

(71) Applicant: FORD GLOBAL TECHNOLOGIES, LLC, Dearbron, MI (US)

(72) Inventors: Michael M. Azzouz, Livonia, MI (US); Larry Dean Elie, Ypsilanti, MI (US); John Wayne Jaranson, Dearborn, MI (US); Jeffrey A. Wallace, Walled Lake, MI (US); Timothy J. Potter, Dearborn, MI (US); Gerald J. Heath, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 14/853,732

(22) Filed: Sep. 14, 2015

(65) Prior Publication Data

US 2017/0074020 A1    Mar. 16, 2017

(51) Int. Cl.
*B60J 5/04* (2006.01)
*E05F 15/611* (2015.01)
(Continued)

(52) U.S. Cl.
CPC .......... *E05F 15/611* (2015.01); *B60J 5/0468* (2013.01); *B62D 65/024* (2013.01); *E05F 5/00* (2013.01);
(Continued)

(58) Field of Classification Search
CPC ......... E05Y 2900/531; E05Y 2201/216; E05Y 2201/246; E05Y 2201/462; E05Y 2400/36;
(Continued)

(56) References Cited

U.S. PATENT DOCUMENTS

| 2,721,353 A | 10/1955 | Mackintosh |
| 2,915,777 A | 12/1959 | Allen |

(Continued)

FOREIGN PATENT DOCUMENTS

| CA | 2034320 C | 11/1994 |
| CN | 101403271 A | 4/2009 |

(Continued)

OTHER PUBLICATIONS

Steeven Zeiß, Alexander Marinc, Andreas Braun, Tobias Große-Puppendahl, Sebastian Beck; "A Gesture-based Door Control Using Capacitive Sensors"; Fraunhofer-Institut für Graphische Datenverarbeitung IGD; pp. 1-10; date unknown.

(Continued)

*Primary Examiner* — D Glenn Dayoan
*Assistant Examiner* — Sunsurraye Westbrook
(74) *Attorney, Agent, or Firm* — Jason Rogers; Vichit Chea; King & Schickli PLLC

(57) ABSTRACT

A mounting assembly for a vehicle side door motor includes an upper hinge element configured for receiving a side door motor drive shaft and a motor mounting bracket configured to receive the side door motor drive shaft and to allow a radial adjustment of the drive shaft for alignment of an axis of the motor with a side door hinge axis. The upper hinge element may define a clevis including a lower clevis portion having a motor drive shaft mounting aperture dimensioned to allow the radial adjustment feature. The motor mounting bracket includes one or more mounting apertures dimensioned to allow a vehicle fore/aft adjustment and in/out adjustment of the side door motor element. The motor mounting assembly is further configured to allow a vehicle up/down adjustment of the side door motor.

17 Claims, 5 Drawing Sheets

(51) Int. Cl.
*E05F 15/614* (2015.01)
*E05F 5/00* (2017.01)
*F16M 1/04* (2006.01)
*B62D 65/02* (2006.01)

(52) U.S. Cl.
CPC ............ *E05F 15/614* (2015.01); *F16M 1/04* (2013.01); *E05Y 2600/56* (2013.01); *E05Y 2900/531* (2013.01)

(58) Field of Classification Search
CPC ... E05Y 2800/00; B60J 5/0413; B60J 5/0472; E05F 15/611; E05F 15/614; E05F 15/63; E05F 15/655; E05F 15/73; E05F 11/50; E05F 15/603
USPC ............... 296/146.4, 146, 11, 146.8, 56, 76; 49/349, 350, 340; 16/355, 367
See application file for complete search history.

(56) References Cited

U.S. PATENT DOCUMENTS

| | | | |
|---|---|---|---|
| 3,344,554 A | 10/1967 | Misaka et al. | |
| 3,357,137 A | 12/1967 | Lombardi et al. | |
| 3,895,281 A | 7/1975 | Corbaz | |
| 4,078,770 A | 3/1978 | Yates et al. | |
| 4,121,382 A * | 10/1978 | Dietrich | E05F 15/614 49/280 |
| 4,143,497 A | 3/1979 | Offenbacher | |
| 4,386,398 A | 5/1983 | Matsuoka et al. | |
| 4,441,376 A | 4/1984 | Tobey | |
| 4,488,753 A | 12/1984 | Koike | |
| 4,497,137 A | 2/1985 | Nelson | |
| 4,501,012 A | 2/1985 | Kishi et al. | |
| 4,501,090 A | 2/1985 | Yoshida et al. | |
| 4,674,230 A | 6/1987 | Takeo et al. | |
| 4,727,679 A | 3/1988 | Kornbrekke et al. | |
| 4,763,111 A | 8/1988 | Matsuo et al. | |
| 4,899,945 A | 2/1990 | Jones | |
| 4,952,080 A | 8/1990 | Boiucaner et al. | |
| 5,236,234 A | 8/1993 | Norman | |
| 5,317,835 A | 6/1994 | Dupuy et al. | |
| 5,355,628 A | 10/1994 | Dranchak | |
| 5,369,911 A | 12/1994 | Fortunato | |
| 5,396,158 A | 3/1995 | Long et al. | |
| 5,434,487 A | 7/1995 | Long et al. | |
| 5,787,636 A | 8/1998 | Buchanan, Jr. | |
| 5,801,340 A | 9/1998 | Peter | |
| 5,913,763 A | 6/1999 | Beran et al. | |
| 6,065,185 A | 5/2000 | Breed et al. | |
| 6,145,354 A | 11/2000 | Kondo et al. | |
| 6,149,222 A * | 11/2000 | Schambre | E05D 3/10 16/334 |
| 6,247,271 B1 | 6/2001 | Fioritto et al. | |
| 6,275,231 B1 | 8/2001 | Obradovich | |
| 6,305,737 B1 | 10/2001 | Corder et al. | |
| 6,341,807 B2 | 1/2002 | Cetnar et al. | |
| 6,370,732 B1 | 4/2002 | Yezersky et al. | |
| 6,401,392 B1 | 6/2002 | Yuge | |
| 6,435,575 B1 | 8/2002 | Pajak et al. | |
| 6,442,902 B1 | 9/2002 | Van Den Oord | |
| 6,498,970 B2 | 12/2002 | Colmenarez et al. | |
| 6,624,605 B1 | 9/2003 | Powder et al. | |
| 6,777,958 B2 | 8/2004 | Haag et al. | |
| 6,928,694 B2 | 8/2005 | Breed et al. | |
| 6,942,277 B2 * | 9/2005 | Rangnekar | E05D 3/127 16/366 |
| 7,034,682 B2 | 4/2006 | Beggs et al. | |
| 7,045,764 B2 | 5/2006 | Beggs et al. | |
| 7,068,146 B2 | 6/2006 | Sasaki et al. | |
| 7,104,589 B2 * | 9/2006 | Takeda | E05F 15/40 296/146.8 |
| 7,132,642 B2 | 11/2006 | Shank et al. | |
| 7,175,227 B2 | 2/2007 | Menard | |
| 7,193,509 B2 | 3/2007 | Bartels et al. | |
| 7,215,529 B2 | 5/2007 | Rosenau | |
| 7,273,207 B2 | 9/2007 | Studer | |
| 7,280,035 B2 | 10/2007 | McLain et al. | |
| 7,320,497 B2 | 1/2008 | Zinn et al. | |
| 7,342,373 B2 | 3/2008 | Newman et al. | |
| 7,377,557 B2 | 5/2008 | Shelley et al. | |
| 7,400,153 B2 | 7/2008 | Shoji et al. | |
| 7,438,346 B1 | 10/2008 | Breed | |
| 7,439,632 B2 | 10/2008 | Ogino et al. | |
| 7,538,506 B2 | 5/2009 | Zinn et al. | |
| 7,540,554 B2 * | 6/2009 | Bals | E05F 15/614 296/146.11 |
| 7,566,087 B2 | 7/2009 | Hanna et al. | |
| 7,686,378 B2 | 3/2010 | Gisler et al. | |
| 7,688,179 B2 | 3/2010 | Kurpinski et al. | |
| 7,874,609 B2 | 1/2011 | Whinnery | |
| 7,886,409 B2 | 2/2011 | Yip | |
| 7,895,712 B2 | 3/2011 | Krumbiegel et al. | |
| 8,007,027 B2 | 8/2011 | Watanabe et al. | |
| 8,077,022 B2 | 12/2011 | Baruco et al. | |
| 8,132,844 B2 | 3/2012 | Sonnek et al. | |
| 8,159,231 B2 | 4/2012 | Sakamaki | |
| 8,169,317 B2 | 5/2012 | Lemerand et al. | |
| 8,186,013 B2 * | 5/2012 | Yip | E05D 11/06 16/239 |
| 8,237,544 B2 | 8/2012 | Nakashima | |
| 8,284,022 B2 | 10/2012 | Kachouh | |
| 8,397,581 B2 | 3/2013 | Ruby, III et al. | |
| 8,511,739 B2 | 8/2013 | Brown et al. | |
| 8,615,927 B2 | 12/2013 | Ezzat et al. | |
| 8,641,125 B2 | 2/2014 | Jimenez et al. | |
| 8,651,461 B2 | 2/2014 | Christensen et al. | |
| 2001/0004164 A1 | 6/2001 | Mattsson | |
| 2002/0039008 A1 | 4/2002 | Edgar et al. | |
| 2003/0038544 A1 | 2/2003 | Spurr | |
| 2003/0222758 A1 | 12/2003 | Willats et al. | |
| 2005/0174077 A1 | 8/2005 | Haag et al. | |
| 2005/0242618 A1 | 11/2005 | Menard | |
| 2005/0280284 A1 | 12/2005 | McLain et al. | |
| 2006/0071505 A1 * | 4/2006 | Ciavaglia | E05F 15/627 296/146.11 |
| 2006/0230574 A1 | 10/2006 | Murayama et al. | |
| 2007/0090654 A1 | 4/2007 | Eaton | |
| 2007/0186480 A1 | 8/2007 | Freeman | |
| 2007/0192038 A1 | 8/2007 | Kameyama | |
| 2008/0211519 A1 | 9/2008 | Kurumado et al. | |
| 2008/0295408 A1 | 12/2008 | Heissler | |
| 2008/0296927 A1 | 12/2008 | Gisler et al. | |
| 2009/0113797 A1 | 5/2009 | Hoermann | |
| 2009/0153151 A1 | 6/2009 | Cho et al. | |
| 2010/0224117 A1 | 9/2010 | Christensen et al. | |
| 2011/0203181 A1 | 8/2011 | Magner et al. | |
| 2011/0260848 A1 | 10/2011 | Rodriguez Barros et al. | |
| 2011/0295469 A1 | 12/2011 | Rafii et al. | |
| 2012/0042572 A1 | 2/2012 | Yuge | |
| 2012/0179336 A1 | 7/2012 | Oakley | |
| 2013/0031747 A1 * | 2/2013 | Gobart | E05D 11/1028 16/82 |
| 2013/0074412 A1 * | 3/2013 | Wellborn | E05C 17/203 49/381 |
| 2013/0091768 A1 | 4/2013 | Houser et al. | |
| 2013/0127479 A1 | 5/2013 | Grills et al. | |
| 2013/0138303 A1 | 5/2013 | McKee et al. | |
| 2014/0000165 A1 | 1/2014 | Patel et al. | |
| 2014/0055349 A1 | 2/2014 | Itoh | |
| 2014/0130299 A1 * | 5/2014 | Jaranson | E05F 1/1215 16/50 |
| 2014/0150581 A1 | 6/2014 | Scheuring et al. | |
| 2014/0297060 A1 | 10/2014 | Schmidt et al. | |
| 2014/0373454 A1 * | 12/2014 | Sasaki | E05F 15/63 49/350 |
| 2015/0059250 A1 * | 3/2015 | Miu | E05F 15/611 49/349 |

FOREIGN PATENT DOCUMENTS

| | | |
|---|---|---|
| CN | 201343938 Y | 11/2009 |
| CN | 101812952 A | 8/2010 |

(56) References Cited

FOREIGN PATENT DOCUMENTS

| | | |
|---|---|---|
| CN | 202294674 U | 7/2012 |
| CN | 103132847 A | 6/2013 |
| CN | 103269914 A | 8/2013 |
| CN | 203143980 U | 8/2013 |
| CN | 103422764 A | 12/2013 |
| CN | 203551964 U | 4/2014 |
| CN | 203580775 U | 5/2014 |
| DE | 4119579 A1 | 12/1992 |
| DE | 4207706 A1 | 9/1993 |
| DE | 10004161 A1 | 8/2001 |
| DE | 10038803 A1 | 2/2002 |
| DE | 10261504 A1 | 8/2004 |
| DE | 102008010836 A1 | 9/2008 |
| DE | 102007062473 A1 | 7/2009 |
| EP | 0397300 A2 | 11/1990 |
| EP | 2174814 A2 | 4/2010 |
| EP | 1265772 A1 | 12/2010 |
| EP | 2287430 A2 | 2/2011 |
| EP | 1899565 B1 | 10/2011 |
| EP | 2583848 A2 | 4/2013 |
| EP | 2765112 A1 | 8/2014 |
| FR | 2873074 A1 | 1/2006 |
| JP | 07285789 A | 10/1995 |
| JP | 2000080828 A | 3/2000 |
| JP | 2000318444 A | 11/2000 |
| JP | 2004176426 A | 6/2004 |
| JP | 2009161959 A | 7/2009 |
| JP | 20100095383 A | 4/2010 |
| JP | 2013007171 A | 1/2013 |
| JP | 2013028903 A | 2/2013 |
| JP | 2014129037 A | 7/2014 |
| JP | 2014148842 A | 8/2014 |
| KR | 20020048811 A | 6/2002 |
| KR | 20130068538 A | 6/2013 |
| WO | 20100098620 A2 | 9/2010 |
| WO | 2013013313 A1 | 1/2013 |
| WO | 2013074901 A2 | 5/2013 |

OTHER PUBLICATIONS

Abd Manan Bin Ahmad; "The Design and Development of a System for Controlling Automotive Functions using Recognition"; Universiti Teknologi Malaysia; pp. 1-100; 2006. Speech.

Haleem, M.S.; "Voice Controlled Automation System"; IEEE International; Dept. of Electron. Eng., NED Univ. of Eng. & Technol.; Multitopic Conference; Print ISBN: 978-1-4244-2823-6; pp. 1-2; Dec. 23-24, 2008.

"InnoTrans 2014: Safety on Vehicle Doors with Non-Touch Detection System from Mayser"; Mayser Safety Technology; pp. 1-1; Aug. 4, 2014.

Bogdan Popa; "How BMW's Soft Close Doors Work"; Autoevolution; pp. 1-6; Aug. 18, 2012.

English machine translation of DE102008010836A1.

English machine translation of DE10261504A1.

English machine translation of CN101812952A.

\* cited by examiner

MOUNTING AND ALIGNING A VEHICLE SIDE DOOR MOTOR WITHIN THE CURRENT BILL OF PROCESS

TECHNICAL FIELD

This disclosure relates generally to vehicle doors, particularly to doors incorporating motor-driven or "smart" door open/close technology.

BACKGROUND

During motor vehicle body shell manufacture and assembly the typical bill of process requires the side doors to be installed on the vehicle body shell and set for alignment to provide appropriate margin and flushness to adjacent body panels. This is achieved by first mounting hinges to the doors, manually or robotically aligning the hinged door assembly to the body shell, and securing the hinges in place. The completed body shell with aligned doors is then cycled through various additional processes, such as corrosion protection, a paint process, and others. After painting, the doors must be removed. This is because during final vehicle assembly access through the door openings is required to install other vehicle components such as the instrument panel, seats and other interior trim. To accomplish this, the doors are removed by removing only the center hinge pin, thus maintaining the alignment for final assembly by way of the respective body and door brackets.

In conventional manufacturing processes, the above-summarized bill of process must be modified for vehicles including side doors incorporating "smart" technology, i.e. motor-driven or assisted opening/closing, door edge protect, power cinch, door open assist, door soft close, and other functions. This is because in a door wherein a motor is mounted to the hinge, the motor assembly must be directly aligned to the hinge axis to provide smooth open/close operation and to reduce or eliminate functional failures. However, the motor mechanism cannot be exposed to certain of the above processes such as corrosion protection, painting, etc., and so cannot be installed until after those processes are completed. Moreover, due to inter-vehicle dimensional variations in door structure, body structure, and hinge assemblies, the hinge axis varies from one vehicle design to another. Thus, the automated process of installing/removing door structures during manufacture/assembly becomes more complicated in vehicles incorporating motor-driven doors, with attendant increases in manufacturing/assembly labor and cost.

To solve these and other problems, the present disclosure describes a side door motor mounting assembly which enables the mounting and proper alignment of a door motor with a door hinge assembly axis. Advantageously, the described mounting assembly includes a radial adjustment feature allowing making adjustments to the motor positioning to ensure direct alignment to the door hinge axis, thus ensuring smooth and proper functioning of the motor-driven door.

SUMMARY

In accordance with the purposes and benefits described herein, in one aspect a door motor mounting assembly is described. The assembly includes a modified vehicle body-mounted upper hinge portion defining a clevis allowing alignment of a side door motor axis to the side door hinge axis. In turn, the assembly includes a motor mounting bracket providing a radial adjustment feature for motor alignment. The motor mounting bracket is supported/reinforced by a door-mounted check bracket. Advantageously, once assembled the motor mounting assembly provides ample clearance for removal of the vehicle doors prior to various processes such as corrosion resistance treatment, painting, etc. alternatively, the described assembly allows accomplishing the described attachment/alignment steps later in the vehicle manufacturing/assembly process, such as in trim and during final assembly.

In another aspect, a method for aligning a door motor in a vehicle door is provided, utilizing the described motor mounting assembly.

In the following description, there are shown and described embodiments of the disclosed side door motor mounting assembly. As it should be realized, the assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed side door motor mounting assembly, and together with the description serve to explain certain principles thereof. In the drawings.

Reference will now be made in detail to embodiments of the disclosed door motor mounting assembly, examples of which are illustrated in the accompanying drawing figures wherein like reference numerals identify like features.

DETAILED DESCRIPTION

Figure 1:
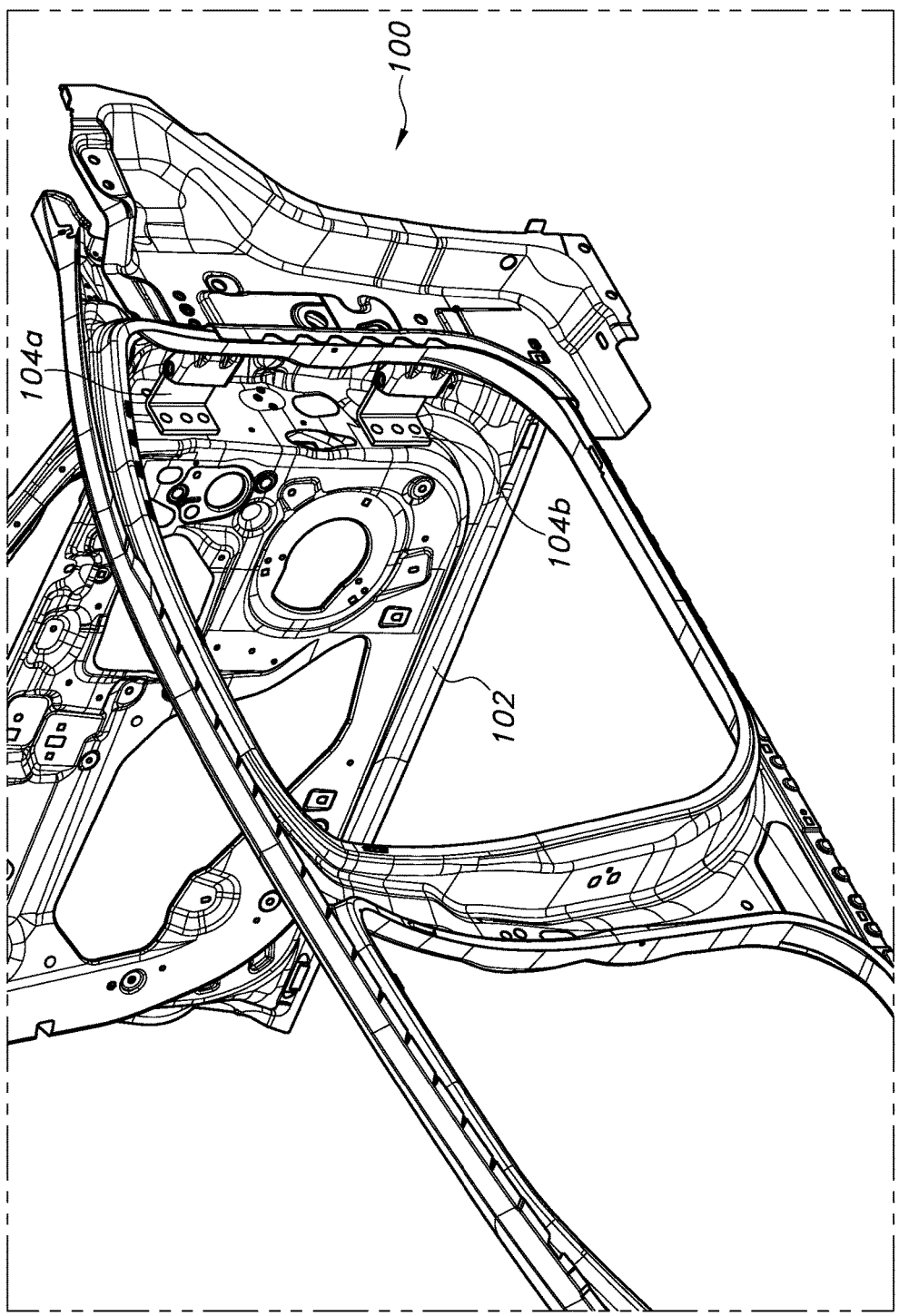
FIG. 1 depicts a side view of a conventional vehicle body/side door assembly.

Reference is now made to FIG. 1 schematically illustrating a conventional vehicle 100 side door assembly. At a high level, such assemblies include at least a side door 102 and one or more vehicle body-mounted hinge assemblies 104, in the depicted embodiment being an upper hinge assembly 104a and a lower hinge assembly 104b. Of course, the vehicle side door 102 depicted in the drawing figure is greatly simplified for purposes of illustration, as a modern vehicle side door can be quite complex and can include many features in addition to those depicted in the drawing. As discussed above, for a motor-driven vehicle side door 102, the motor (not shown in this view) cannot be passed through certain processes, such as corrosion protection, painting, etc. Instead, the typical procedure is to install or re-install the motor in trim or during final assembly, after the above processes are completed.

Figure 2A:
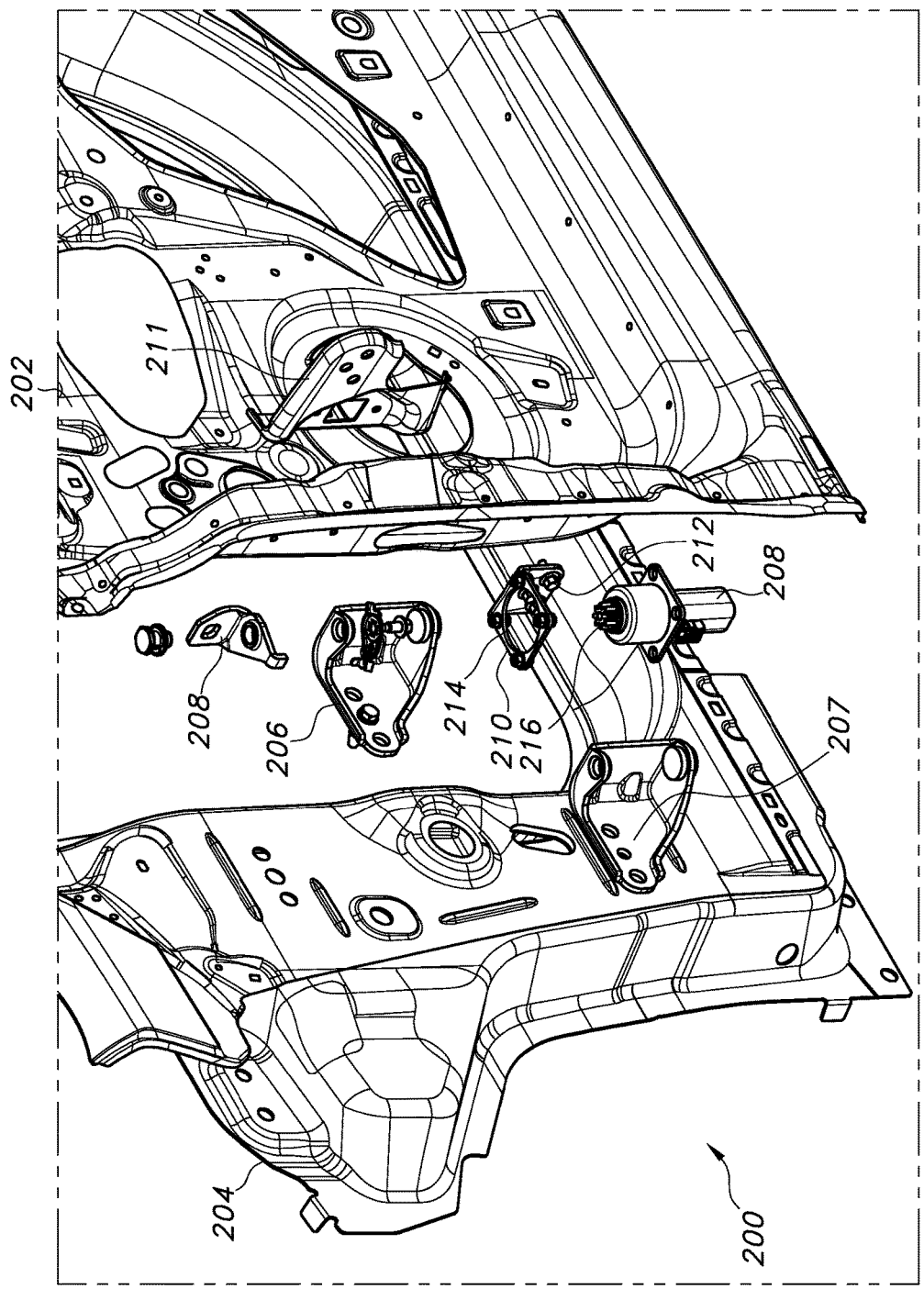
FIG. 2A depicts an exploded side view of a motor-driven side door motor mounting assembly according to the present disclosure.

However, as is also discussed above, it is important to properly align the motor to ensure proper opening/closing of the side door. Specifically, at final vehicle assembly it is important to align a longitudinal axis of the side door motor with a longitudinal axis defined by the vehicle side door hinge assembly. To solve this and other problems, with reference to FIG. 2A there is depicted a vehicle side door assembly 200. The assembly 200 includes at least a side door 202 which is hingedly attached to a vehicle body 204 by a hinge assembly, in the depicted embodiment including an upper hinge element 206 and a lower hinge element 207. A motor 208 is included to drive automatic or manually initiated opening/closing of the side door 202. Such motors are well known in the art, and do not require extensive discussion or description herein.

The assembly 200 further includes a motor mounting bracket 210 configured for attachment to a door-mounted check element 211. The motor mounting bracket 210, which in the depicted embodiment substantially defines an L shape, includes a plurality of mounting apertures 212, each of which is dimensioned to allow a radial slip of the motor 208 for alignment of a longitudinal axis of the motor with a longitudinal axis of the hinge assembly. The motor mounting bracket 210 further includes a drive shaft aperture 214 for receiving a drive shaft 216 of the motor 208, also dimensioned to allow a radial slip of the motor 208. Additional door-mounted support brackets 218 may be provided.

Figure 2B:
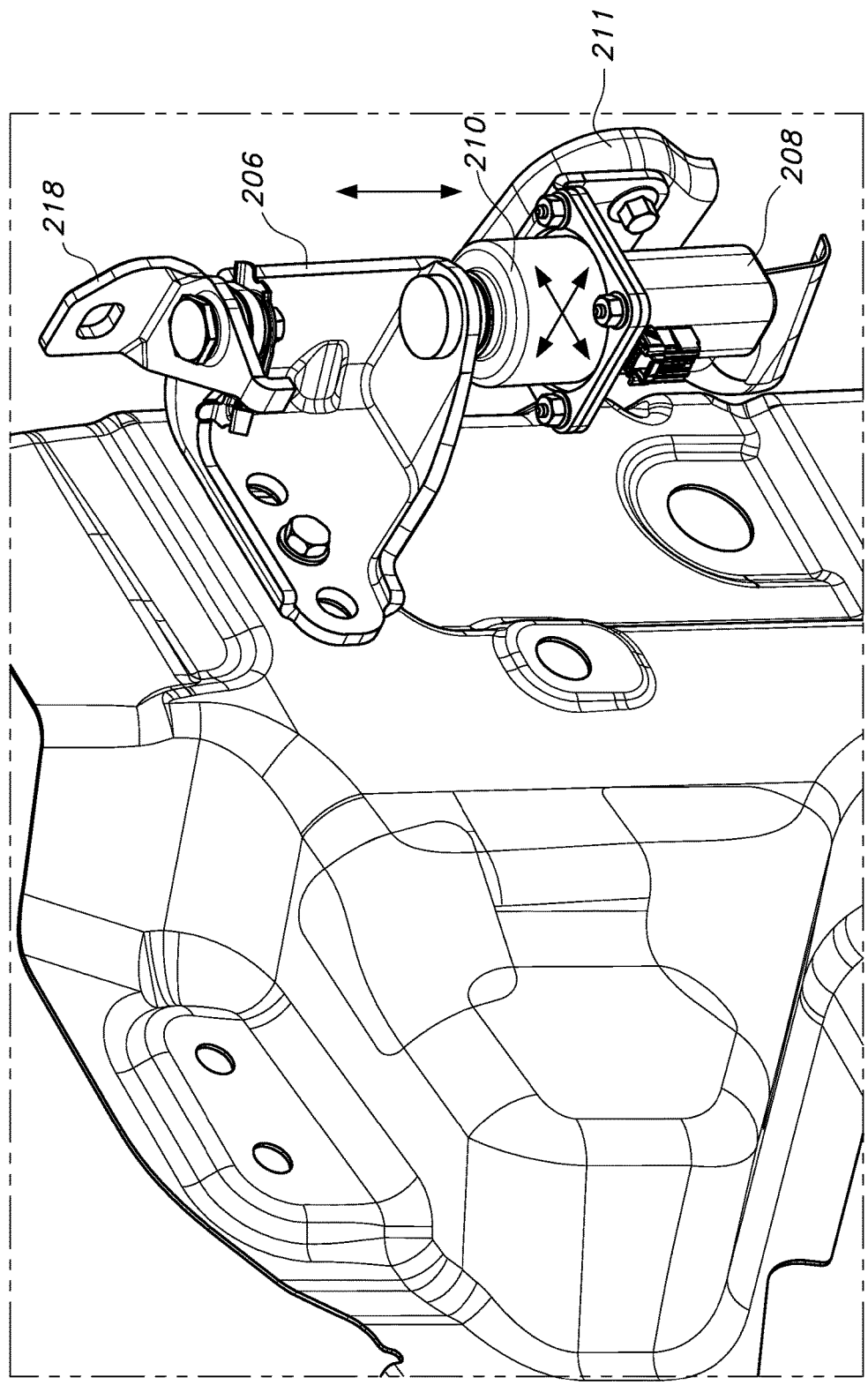
FIG. 2B depicts an isolated view of the assembled side door motor mounting assembly of FIG. 2A.
Figure 2C:
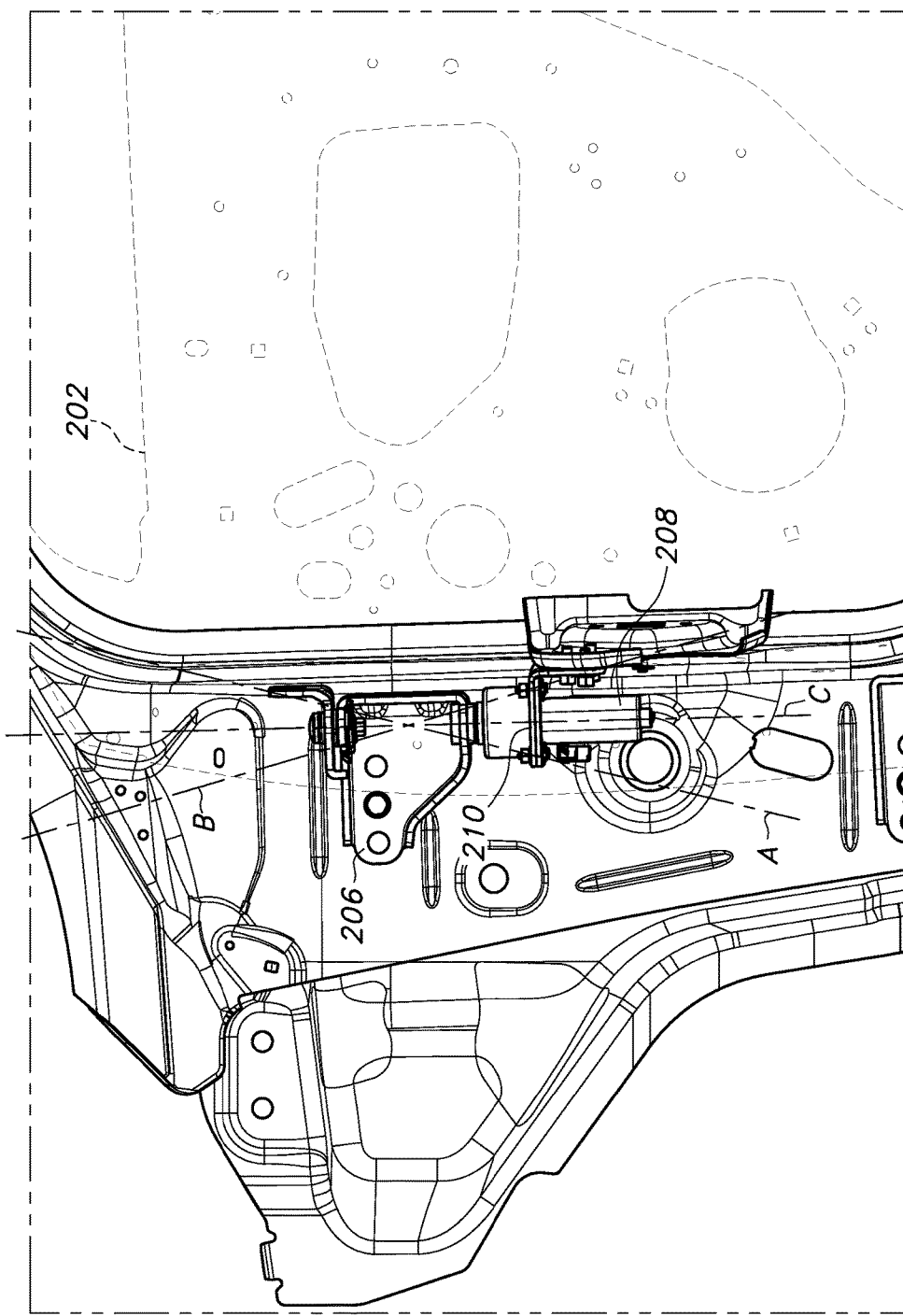
FIG. 2C depicts adjustment of a longitudinal axis of a motor of the side door motor mounting assembly of FIG. 2A.

With reference to FIG. 2B, the motor 208, body-mounted upper hinge 206, motor mounting bracket 210, and door check element 211 are shown in an assembled configuration. By the dimensions of motor mounting bracket apertures 212, 214, as shown by the arrows a vehicle fore/aft, in/out, and up/down adjustment or slip is made possible, allowing alignment of the motor 208 longitudinal axis (broken lines A, B) with a longitudinal axis defined by the hinge assembly 206, 207. This is shown in greater detail in FIG. 2C.

Figure 3:
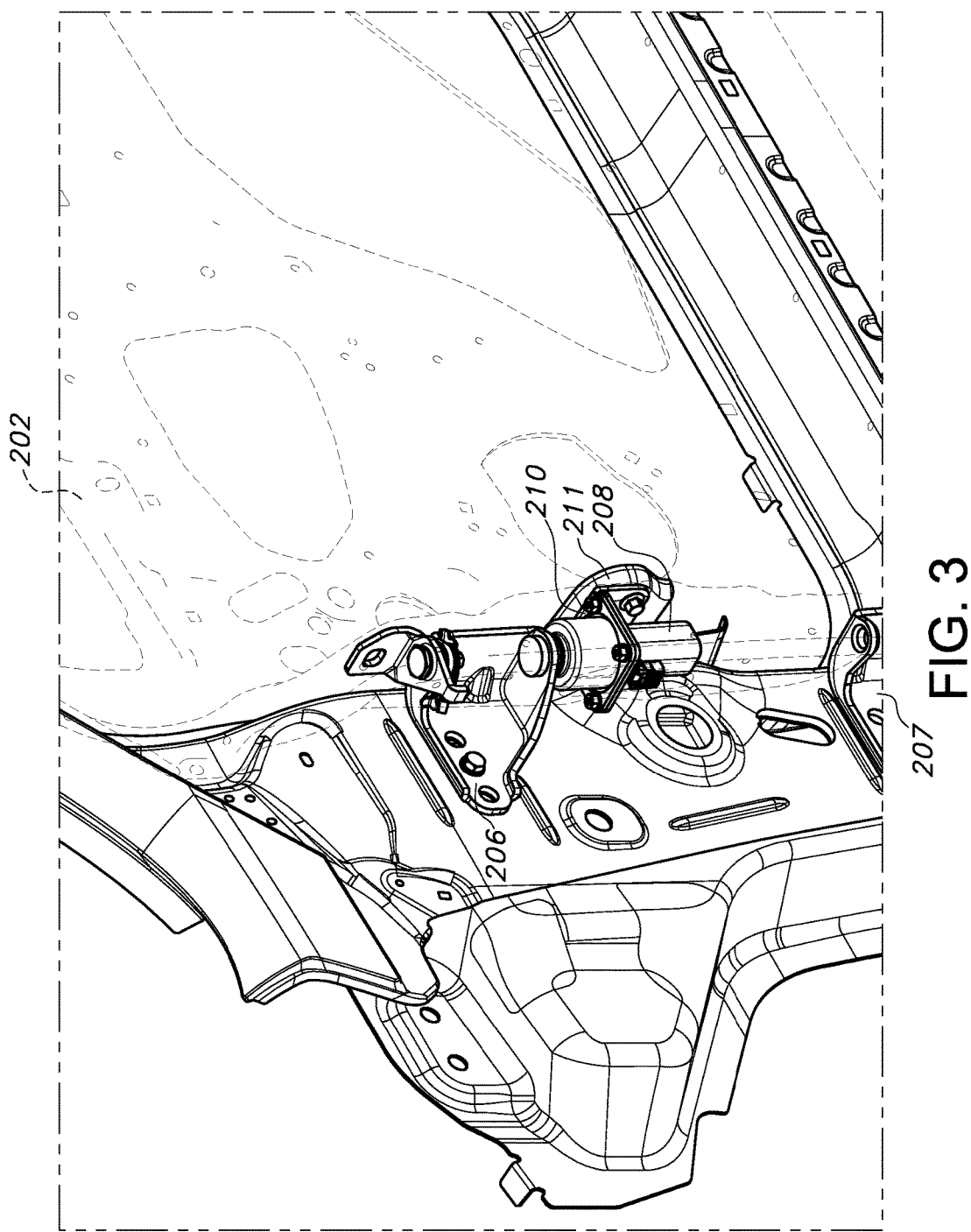
FIG. 3 depicts an assembled vehicle body/motor-driven side door according to the present disclosure.

Thus, at final assembly of the vehicle body 204 and side door 202 (see FIG. 3), a properly aligned motor 208 can be provided, ensuring a smooth and reliable opening/closing of the side door 202. As a further advantage, best as shown in FIG. 2B by use of the described upper hinge 206, ample clearance is provided for removal of fasteners during the process of removal of the vehicle door 202 and motor 208 prior to processes such as corrosion protection, painting, etc.

Obvious modifications and variations are possible in light of the above teachings. All such modifications and variations are within the scope of the appended claims when interpreted in accordance with the breadth to which they are fairly, legally and equitably entitled.

What is claimed:

1. A mounting assembly for a vehicle side door motor, comprising a motor mounting bracket configured to allow a radial adjustment of a side door motor element for alignment of a motor element longitudinal axis with a side door hinge assembly longitudinal axis.

2. The mounting assembly of claim 1, wherein the side door hinge assembly includes an upper hinge element having a lower clevis providing a longitudinal axis reference point for the side door motor element and the side door hinge assembly.

3. The mounting assembly of claim 1, wherein the motor mounting bracket includes one or more mounting apertures dimensioned to allow a vehicle fore/aft adjustment and in/out adjustment of the side door motor element.

4. The mounting assembly of claim 3, wherein the motor mounting bracket is configured to allow a vehicle up/down adjustment of the side door motor element.

5. The mounting assembly of claim 1, further including a side door check element configured for supporting the motor mounting bracket.

6. A vehicle including the assembly of claim 1.

7. A vehicle side door assembly, comprising:
a hinged side door;
a motor for opening/closing the hinged side door assembly; and
a motor mounting bracket configured to allow a radial adjustment of a side door motor element for alignment of a motor element longitudinal axis with a side door hinge assembly longitudinal axis.

8. The side door assembly of claim 7, wherein the side door hinge assembly includes an upper hinge element having a lower clevis providing a longitudinal axis reference point for the side door motor element and the side door hinge assembly.

9. The side door assembly of claim 7, wherein the motor mounting bracket includes one or more mounting apertures dimensioned to allow a vehicle fore/aft adjustment and in/out adjustment of the side door motor element.

10. The side door assembly of claim 9, wherein the motor mounting bracket is configured to allow a vehicle up/down adjustment of the side door motor element.

11. The side door assembly of claim 7, further including a side door check element configured for supporting the motor mounting bracket.

12. A vehicle including the assembly of claim 7.

13. A vehicle, comprising:
a body;
a side door including a hinge assembly;
a motor for opening/closing the hinged side door; and
a motor mounting bracket configured to allow a radial adjustment of a side door motor element for alignment of a motor element longitudinal axis with a side door hinge assembly longitudinal axis.

14. The vehicle of claim 13, wherein the side door hinge assembly includes an upper hinge element having a lower clevis providing a longitudinal axis reference point for the side door motor element and the side door hinge assembly.

15. The vehicle of claim 13, wherein the motor mounting bracket includes one or more mounting apertures dimensioned to allow a vehicle fore/aft adjustment and in/out adjustment of the side door motor element.

16. The vehicle of claim 15, wherein the motor mounting bracket is configured to allow a vehicle up/down adjustment of the side door motor.

17. The vehicle of claim 13, further including a side door-mounted door check element configured for supporting the motor mounting bracket.

\* \* \* \* \*